United States Patent [19]
Baldwin

[11] Patent Number: 6,123,346
[45] Date of Patent: *Sep. 26, 2000

[54] TREASURE CHEST CHANGE CART

[75] Inventor: William C. Baldwin, Costa Mesa, Calif.

[73] Assignee: Phoenix Manufacturing, Inc., Santa Ana, Calif.

[ * ] Notice: Under 35 U.S.C. 154(b), the term of this patent shall be extended for 326 days.

[21] Appl. No.: 08/567,081

[22] Filed: Dec. 4, 1995

[51] Int. Cl.⁷ ...................................................... B62B 3/00
[52] U.S. Cl. ..................................... 280/47.35; 280/47.16; 280/79.2; 280/755
[58] Field of Search ............................. 280/47.16, 47.19, 280/47.2, 47.26, 47.34, 47.35, 79.2, 755; 220/345; 312/249.8, 249.11, 290, 295; 796/22, 100

[56] References Cited

U.S. PATENT DOCUMENTS

| | | | |
|---|---|---|---|
| D. 179,687 | 2/1957 | Johnson | 296/22 |
| 592,177 | 10/1897 | Stutsman . | |
| 870,477 | 11/1907 | Snyder | 220/345 |
| 913,943 | 3/1909 | Bown | 280/47.34 |
| 1,962,454 | 6/1934 | Meanor et al. | 280/79.2 |
| 2,033,191 | 3/1936 | Ellis | 280/79.2 |
| 2,216,972 | 10/1940 | Gibson et al. | 280/47.16 |
| 2,413,164 | 12/1946 | Boldt et al. | 296/22 |
| 2,784,999 | 3/1957 | Hunt . | |
| 2,948,798 | 8/1960 | Ness | 280/79.2 |
| 3,573,879 | 4/1971 | Bergkamp et al. . | |
| 3,877,744 | 4/1975 | Miller | 296/22 |
| 3,889,964 | 6/1975 | Pitts, Jr. . | |
| 3,889,967 | 6/1975 | Sauer . | |
| 3,963,258 | 6/1976 | Stone et al. | 280/47.34 |
| 4,017,091 | 4/1977 | Wallen . | |
| 4,118,048 | 10/1978 | Spranger et al. . | |
| 4,597,122 | 7/1986 | Handler et al. . | |
| 4,652,062 | 3/1987 | Greenwood . | |
| 4,811,964 | 3/1989 | Horn . | |
| 4,832,254 | 5/1989 | LaFreniere . | |
| 4,861,049 | 8/1989 | Losi | 280/47.16 |
| 4,886,286 | 12/1989 | Whorton, III . | |
| 4,989,291 | 2/1991 | Parent . | |
| 5,190,302 | 3/1993 | Trotta . | |
| 5,289,936 | 3/1994 | Jones et al. | 280/33.992 |
| 5,306,028 | 4/1994 | Pike et al. . | |
| 5,306,033 | 4/1994 | Evans | 280/33.992 |
| 5,307,957 | 5/1994 | Carlsson et al. | 312/249.11 |

FOREIGN PATENT DOCUMENTS

| | | | |
|---|---|---|---|
| 1016523 | 11/1952 | France | 280/47.16 |
| 3126823 | 1/1983 | Germany | 280/47.34 |
| 342933 | 2/1931 | United Kingdom | 280/47.34 |
| 918012 | 5/1958 | United Kingdom . | |

*Primary Examiner*—J. J. Swann
*Assistant Examiner*—James S. McClellan
*Attorney, Agent, or Firm*—Price, Gess & Ubell

[57] ABSTRACT

A casino money cart having a number of storage bays, a pair of bicycle wheels center-mounted on axles located between internal bulkhead panels and outer side panels, and four slightly recessed corner casters. The bulkhead panels form part of an internal frame structure which mounts the outer side panels, as well as front and back outer panels. Corner trim elements and rivets tie the outer panels together and to the internal frame structure. A crowned or arched sliding top cover serves to prevent objects from being placed on top of the money cart and gives the cart a "treasure chest" look. An angle-mounted roller drawer slide mechanism is additionally provided which biases a rear access cash drawer in the "in" position.

27 Claims, 9 Drawing Sheets

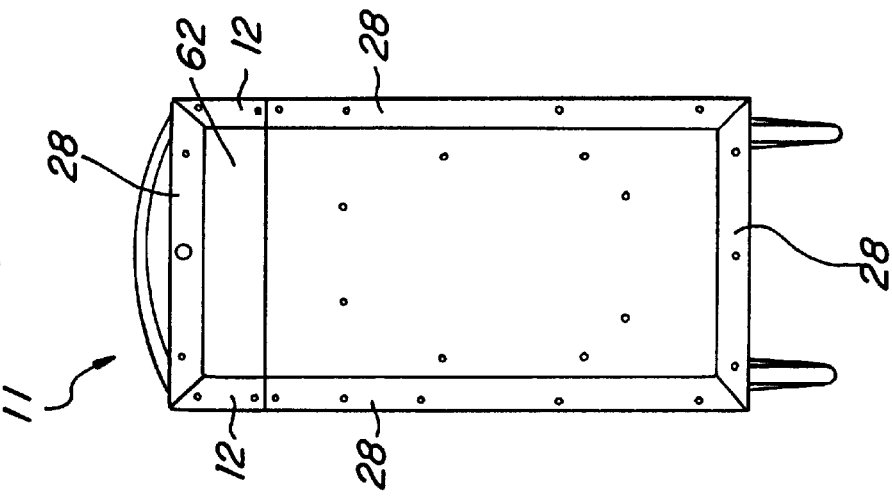
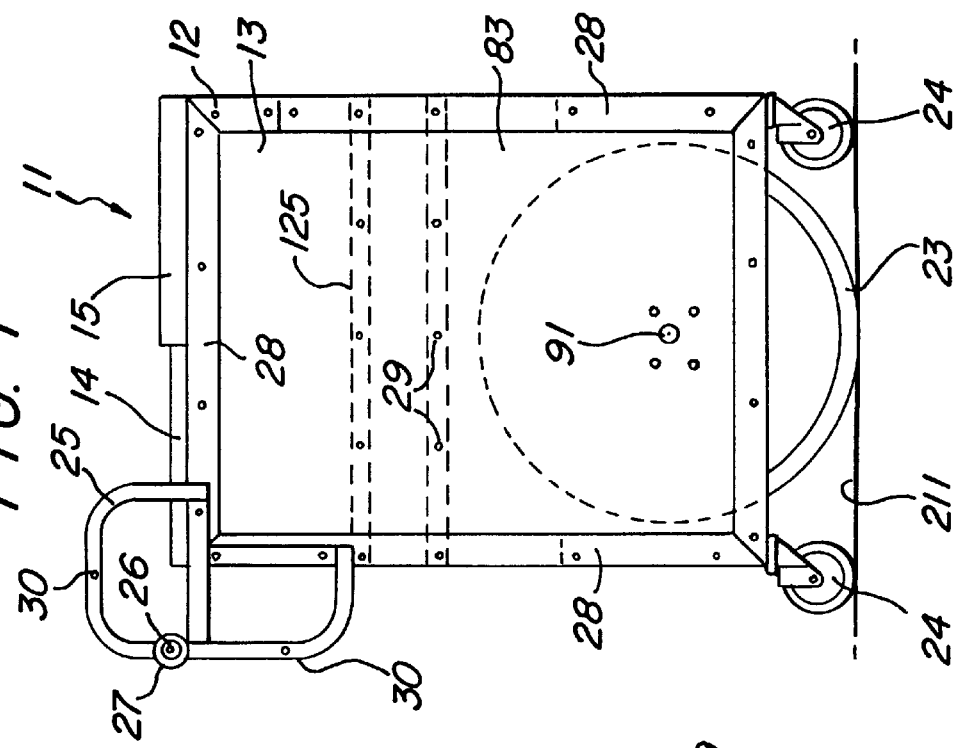
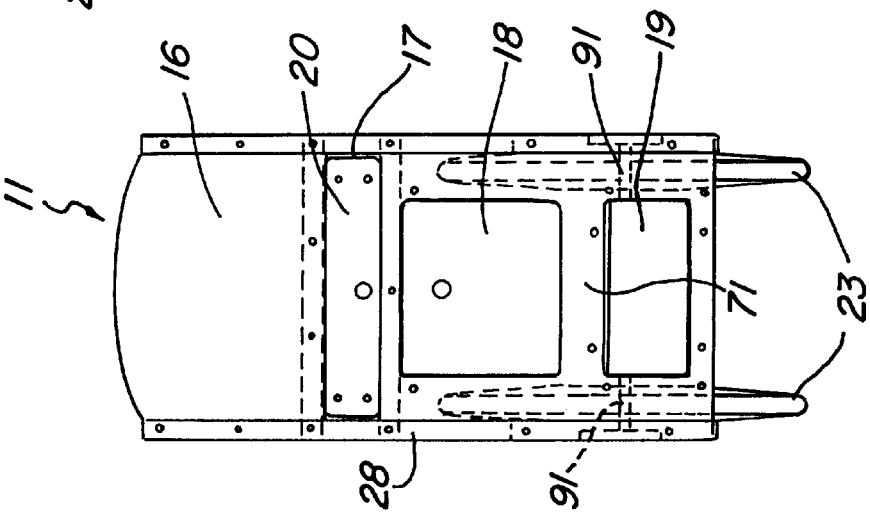

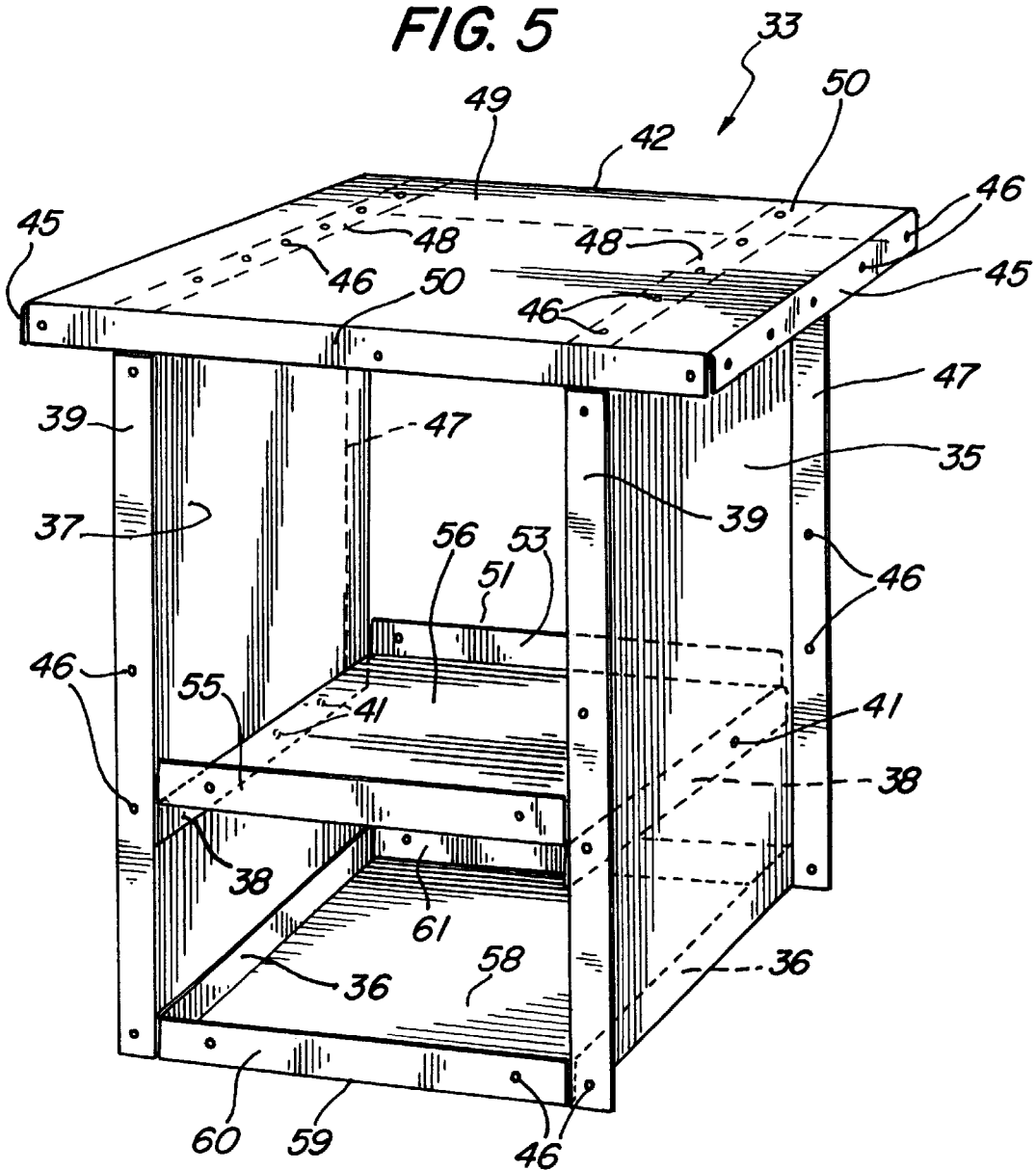

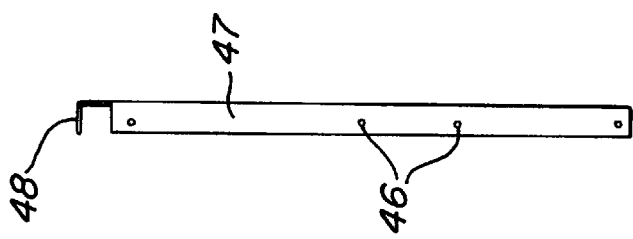
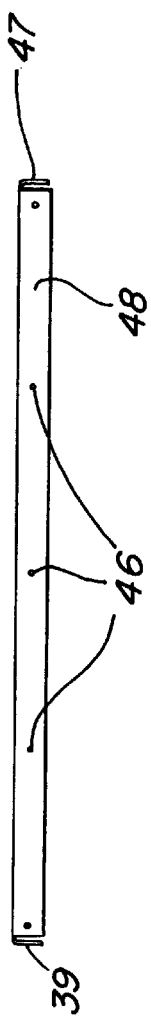
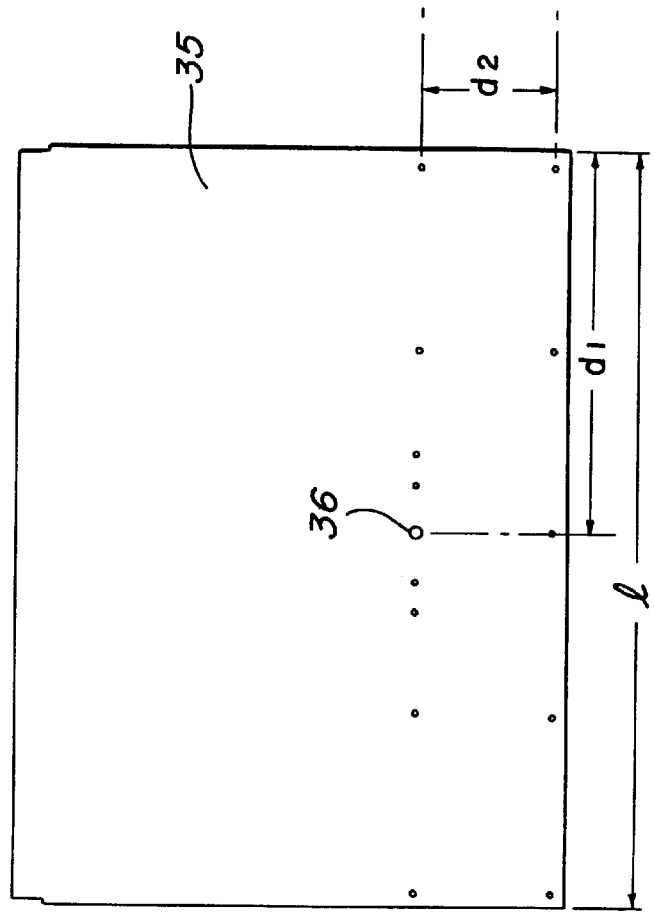

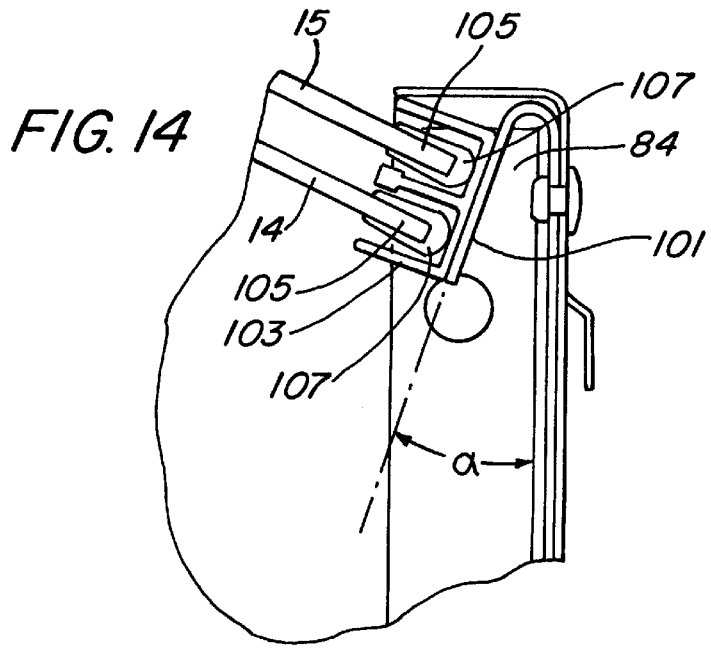
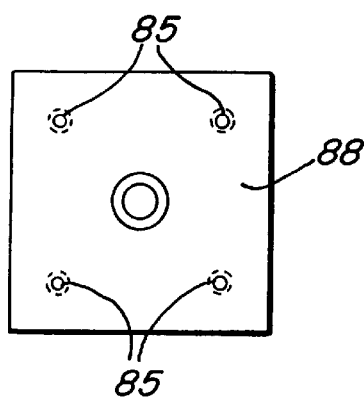
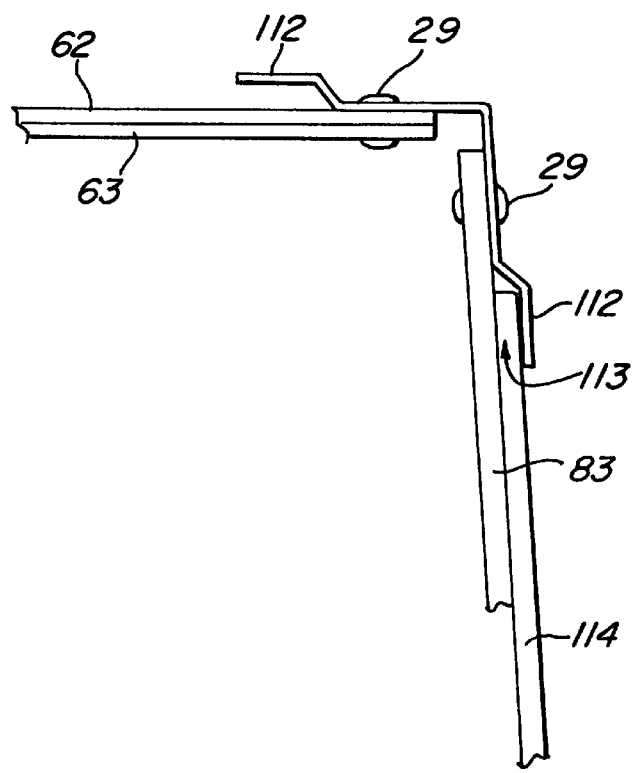

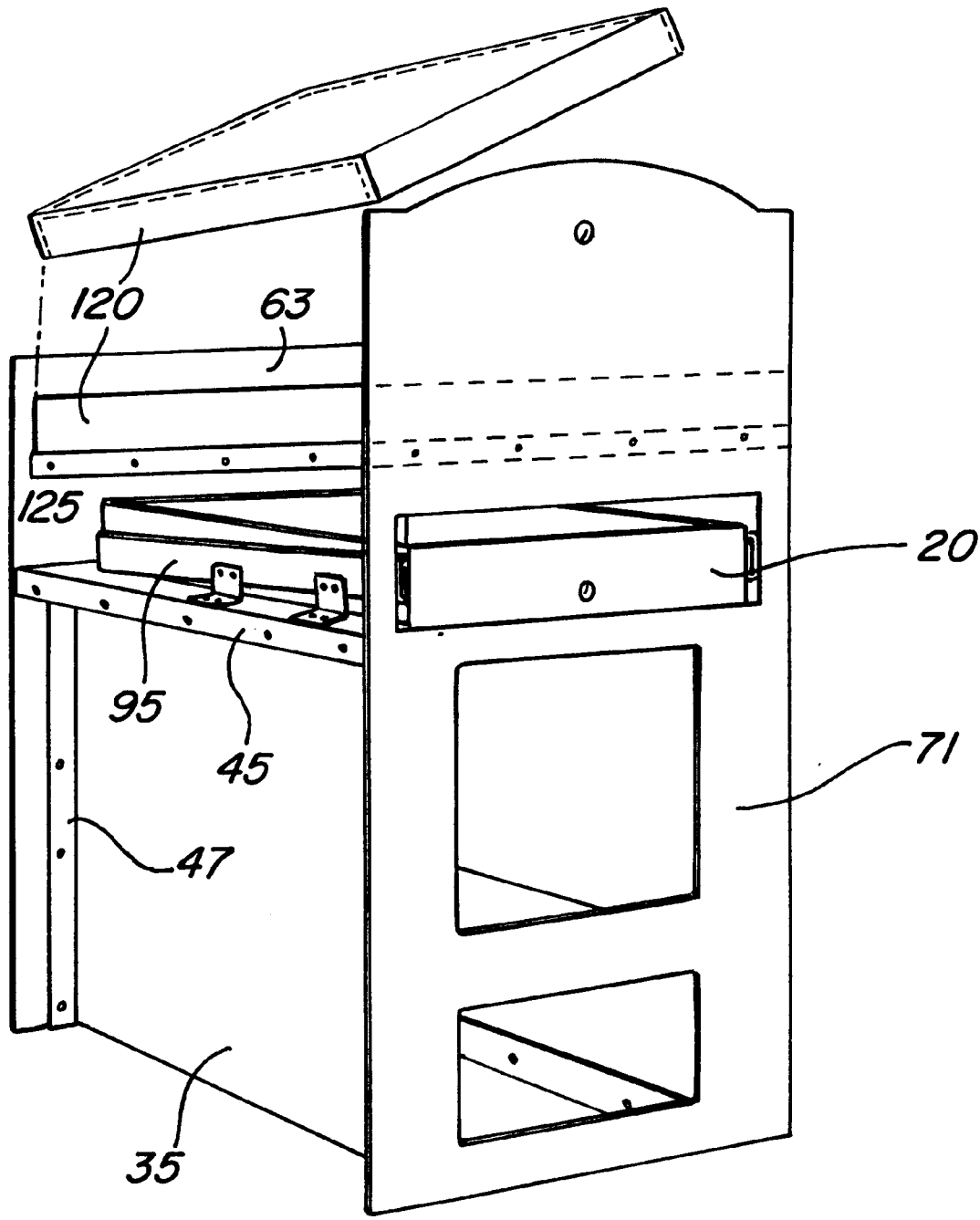

TREASURE CHEST CHANGE CART

BACKGROUND OF THE INVENTION

1. Field of the Invention

The subject invention relates generally to transportation devices and, more specifically, to casino change carts.

2. Description of Related Art

Devices or carts for transporting money in casinos are known in the prior art. One such prior art cart is illustrated in U.S. Pat. No. 5,306,028. The cart design of the 5,306,028 patent suffers a number of drawbacks, including relatively poor maneuverability and a carriage scheme which is unbalanced and presents the risk of the cart tipping over. A cumbersome and complex vertical sliding handle adjustment mechanism is also employed. The overall structural approach also contributes to less than robust performance and product longevity.

OBJECTS AND SUMMARY OF THE INVENTION

It is therefore an object of the invention to improve apparatus for transporting money;

It is another object of the invention to provide an improved casino money cart;

It is another object of the invention to provide a highly maneuverable casino money cart;

It is another object of the invention to provide a money cart design which eliminates the risk of tipping over; and It is another object of the invention to provide a money cart of improved durability, strength, and ease of use.

According to the invention a casino money cart is provided having a pair of bicycle wheels and four corner casters. The bicycle wheels are center-mounted on axles located between internal bulkhead panels and outer side panels. The bulkhead panels form part of an internal frame structure which mounts the outer side panels, as well as front and back outer panels. A crowned or arched sliding top cover is further provided which serves to prevent or discourage objects from being placed on top of the money cart and which gives the cart a "treasure chest" look. An angle-mounted roller drawer slide mechanism is additionally provided which biases a rear access cash drawer in the "in" position.

The four corner casters are mounted so as to recess the plane of their operation slightly above the contact point of the bicycle wheels. The four corner casters stabilize the cart when it traverses hard surfaces, and may be spring-loaded to negotiate floor plates. On carpet, the corner casters touch the carpet but still permit the center-mounted wheels to carry the weight of the cart and its contents, while providing relatively effortless pivoting of the cart within its own length.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIG. 1 is a side view of a change cart according to the preferred embodiment;

FIG. 2 is a back view of the cart of FIG. 1;

FIG. 3 is a side view of the cart of FIG. 1;

FIG. 5 is a side view of an internal bulkhead panel according to the preferred embodiment;

FIGS. 8 and 9 illustrate front panel sections according to the preferred embodiment;

FIG. 14 is a fragmentary end view illustrating the door slide mechanism according to the preferred embodiment;

FIG. 15 is a side view of an axle block used in the preferred embodiment;

FIG. 16 is a fragmentary side perspective view illustrating the drawer slide mechanism according to the preferred embodiment;

FIG. 17 is a partial top view illustrating a corner trim element according to the preferred embodiment.

DETAILED DESCRIPTION OF THE PREFERRED EMBODIMENTS

Figure 4:
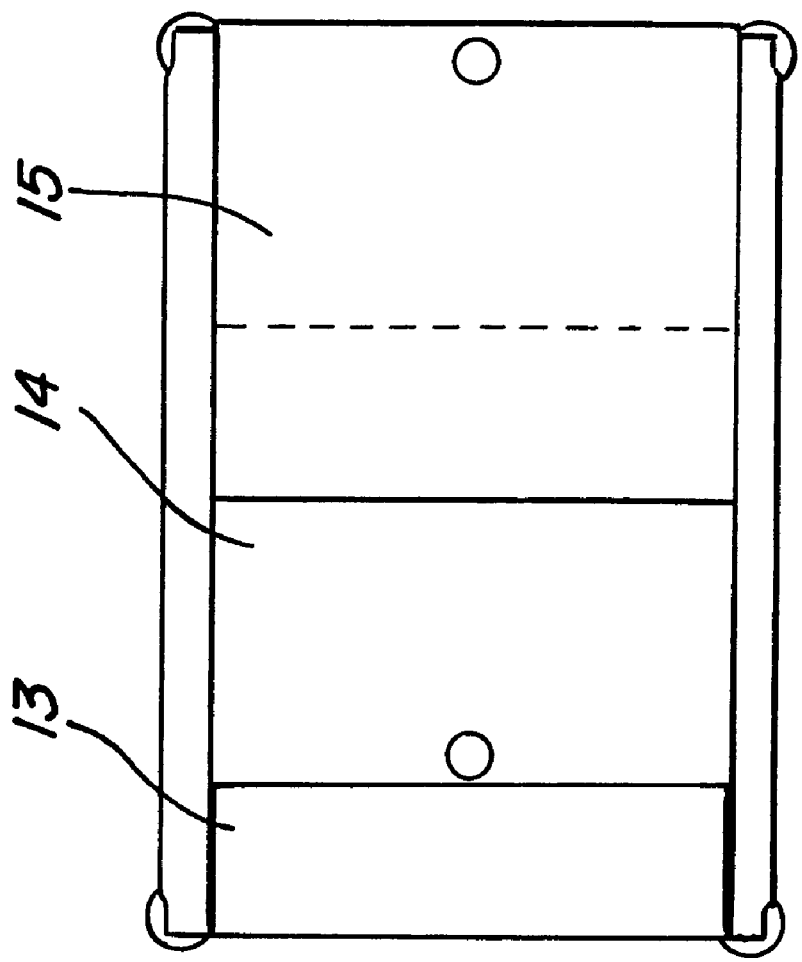
FIG. 4 is a perspective view of an internal frame structure for a cart according to the preferred embodiment.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a particularly durable, readily manufacturable, and conveniently operable money cart embodiment.

As illustrated in FIGS. 1–4, the preferred embodiment money cart 11 provides a variable high payload bay 13 covered by two sliding, overlying arched, crowned cover sections 14, 15. The rear panel 16 of the money cart 11 includes openings 17, 18, 19. The first opening 17 accommodates a sliding, lockable cash drawer 20 mounted on ball bearing drawer slides 95 (FIG. 16). The second and third openings 18, 19 respectively provide a first storage bay for storage of, for example, coin cans, and a second storage bay.

Figure 12:
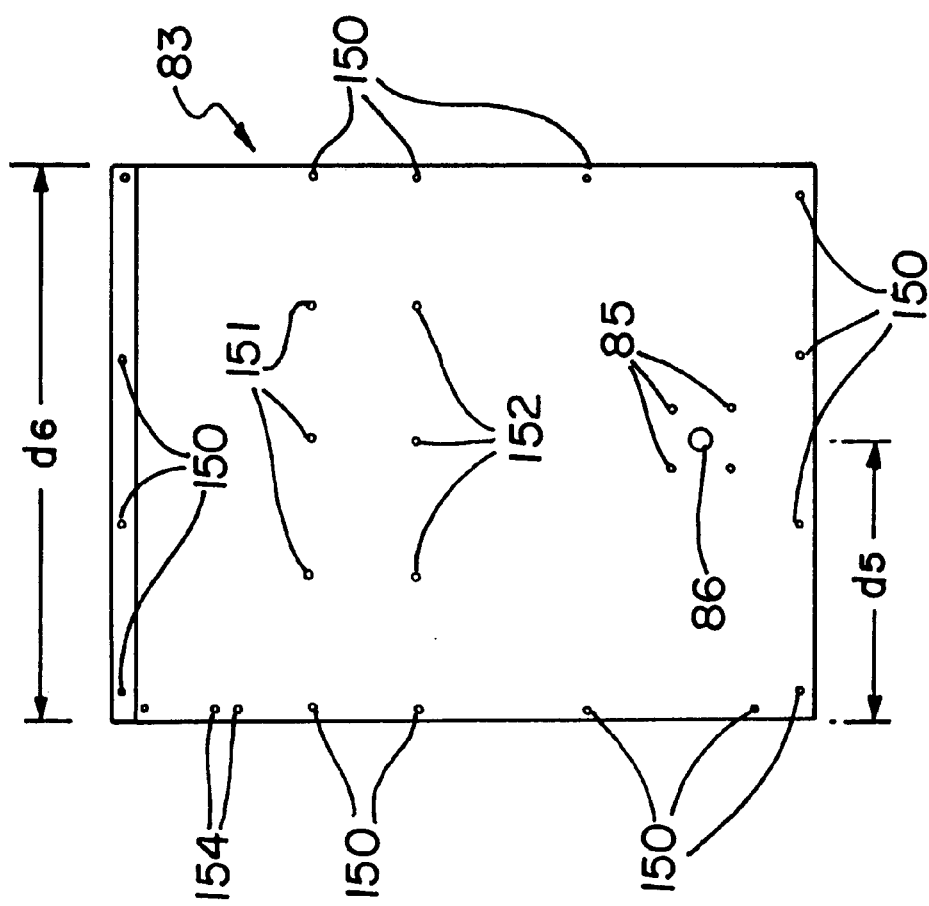
FIG. 12 is an end view of the panel of FIG. 11.

First and second 20-inch main wheels 23 are center mounted for rotation by axles 91 located between respective internal bulkhead panels 35, 37 (FIG. 5) and respective outer panels 83 (FIG. 12). A spring-loaded caster 24 is provided at each of the four corners of the money cart 11. These casters 24 are each recessed slightly above the plane 211 of the 20-inch wheels, for example, by a distance of from ¼- to 3/16-inch. As those skilled in the art will appreciate, the plane of the wheels 23 lies perpendicular to the page in FIG. 1, and line 211 actually represents the intersection of the plane of the wheels 23 with the page.

A fixed handle 25 with a three-position crossbar 26 is fixedly mounted to the upper rear of the money cart 11. The crossbar 26 may be moved to alternate positions 30 by removing two threaded knobs 27 at each end of the crossbar 26. Side panels 83, typically fabricated of plexiglass, slide in and out of edge trim pieces 12, 28. The panels 83 cover rivets, e.g. 29 attaching the outer panels of the money cart 11 to an internal frame structure 33.

The internal frame structure 33 of the money cart 11 is illustrated in FIG. 5. It includes first and second identically-formed bulkhead panels 35, 37, a top frame panel 42, an inner shelf panel 51, and a bottom shelf panel 59. These panels 35, 37, 42, 51, 59 are preferably fabricated of low carbon steel.

The bulkhead panels 35, 37 are further illustrated in FIGS. 6–8. They are rectangular in shape and each includes a respective rectangular front flange 39, rear flange 47, and top flange 48 integrally formed at a right angle to the rectangular surface. The top flanges 48 mount the top frame panel 42, which has a rectangular planar top surface 49. Extending from the planar surface 49 at right angles thereto and integrally formed therewith are respective rectangular side flanges 45 and front and rear flanges 50.

The inner frame panel 51 and the bottom shelf panel 59 are mounted within the bulkhead panels 35, 37 by rivets inserted into respective rectangular side flanges 36, 38. The inner frame panel 51 features a rectangular planar panel surface 56 with rectangular front and rear flanges 53, 55. The front and rear flanges 53, 55 and the side flanges 38 are formed integrally with and at a right angle to the rectangular planar surface 56.

The bottom shelf panel 59 similarly has a rectangular planar bottom surface 58, which forms the bottom of the money cart 11. This planar bottom surface 59 has respective front and rear flanges 60, 61, and the side flanges 36 formed integrally therewith and at a right angle thereto. All of the flanges 36, 38, 39, 45, 47, 48, 50, 53, 55, 60, 61 of the frame structure 33 have holes, e.g. 46 drilled therein to facilitate fastening of the outer panels 62, 63, 71, 83 (FIGS. 9–12) thereto, preferably by riveting, although other fastening mechanisms could be employed. Riveting provides a particularly strong, solid, and sturdy cart structure.

As further shown in FIG. 6, each of the respective bulkhead panels 35, 37 has a hole 36 drilled at the midpoint of the length thereof. For example, in one embodiment, the length l is 24.12 inches, the distance $d_1$ is 12.06 inches, and the distance $d_2$ is 4.355 inches. Each hole 36 lies concentrically with a like diameter hole formed in a respective inner shelf side flange 38, thereby providing a double thickness bearing surface for a respective end of each axle 91. As noted, a number of holes 46 are drilled in the front, rear, and top flanges for facilitating attachment of the top panel 42 and the front and rear panel structures, which will now be described in connection with FIGS. 9–11.

Figure 9:
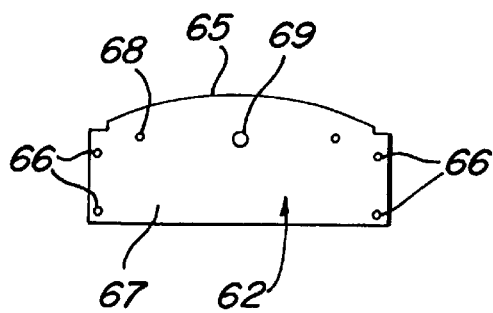
Figure 10:
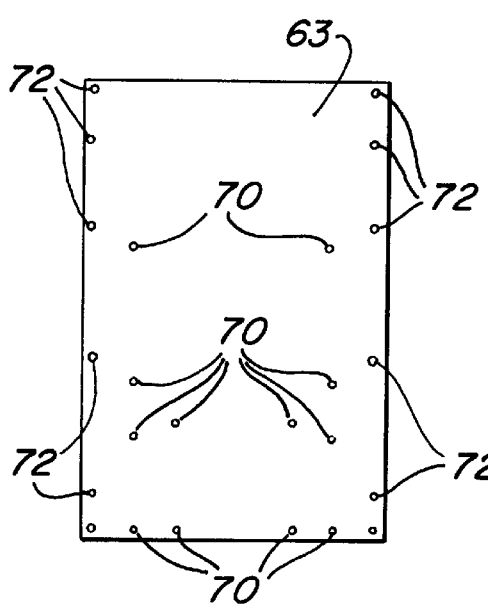
FIG. 10 illustrates a rear panel according to the preferred embodiment.
Figure 11:
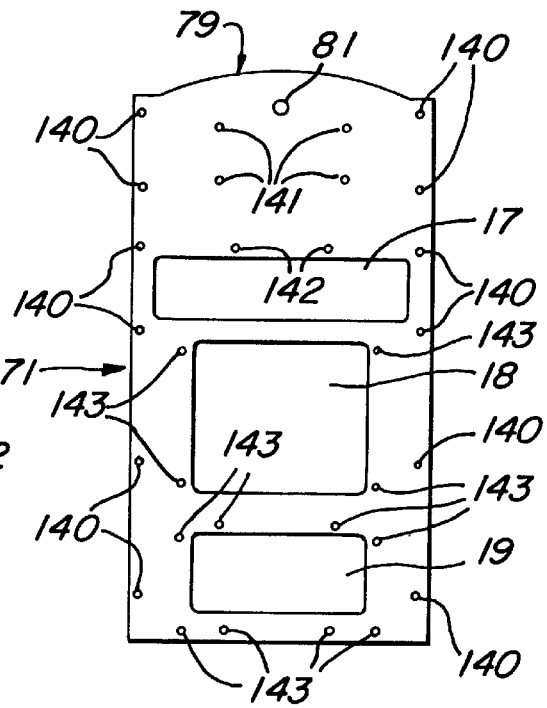
FIG. 11 is a side elevational view of a side panel according to the preferred embodiment.

The front panel structure includes a top panel 62 and a rectangular bottom panel 63 as shown in FIGS. 9 and 10. The top panel 61 includes a crowned portion 65 located above a generally rectangular base portion 67. A centrally-located "D" hole 69 is formed in the top panel 62 in order to accommodate a lock for the first of the sliding doors 15. A number of holes 66, 68 are drilled in the top panel 61. The holes 66 facilitate attachment to short corner trim sections 12. The top panel 62 is preferably riveted to the front of each short trim section 12, which sections 12 are then screwed into the side panels 83 to enable the top panel 61 to be readily removed so that the sliding door or cover sections 14, 15 can be inserted and removed. Screws are also employed to attach the horizontal trim elements 28 around the bottom edge of the cart so that those trim features 28 can be easily removed to permit insertion of decorative panels.

Twenty-five holes are drilled in the lower front panel 63. The holes 70 facilitate attachment to the flanges 39, 47 of the bulkhead panels 35, 37 and flanges 50 of the top panel 42. The holes 72 attach corner trim elements 28. The lower front panel is preferably fabricated from 0.063-inch-thick aluminum sheet, while the top front panel is preferably fabricated of 0.125-inch-thick aluminum sheet. The thickness 0.125 sheet is required to adequately support the locking mechanism for the sliding doors 14, 15.

The rear panel 71 (FIG. 11) is preferably fabricated of 0.125-inch-thick aluminum sheet and includes generally rectangular openings 17, 18, 19, which form the cash drawer bay 17, an open coin can bay 18, and a utility bay 19, as previously noted. The rear panel 71 is generally rectangular on three sides and has a crowned contour 79 on its fourth side matching the contour of the crowned portion 65 of the top front panel 62. A second "D" hole 81 is formed near the center of the middle of the rear panel 71 to accommodate a second lock for a second of the sliding doors. Suitable holes are again drilled to facilitate attachment of the rear panel 71 to the flanges of the inner frame 33 and to cooperating corner trim elements. Holes 140 attach corner trim elements 28, while holes 141 attach receptacles for attaching a coin dispenser. Holes 142 attach top frame support clips 125. Holes 143 attach internal frame structure 33.

A side panel 83 is illustrated in FIG. 12. The side panel 83 is generally rectangular and may be fabricated from 0.063-inch-thick aluminum sheet. An axle hole 85 is centrally located in the side panel 83 to lie concentrically with the hole 41 of the respective juxtaposed bulkhead panel 35, 37. Exemplary dimensions $d_5$, $d_6$, and $d_7$ for locating the hole 85 are 12 inches, 24 inches, and 4.355 inches, respectively. Again, a number of holes 150, 151, 153, 154 are provided for riveting the side panel 83 to the appropriate flanges and to corner trim pieces. Holes 150 attach corner trim elements 28. Holes 151 attach top frame support clips 125. Holes 152 attach internal frame structure 33. Holes 154 attach removable panel 62.

Figure 13:
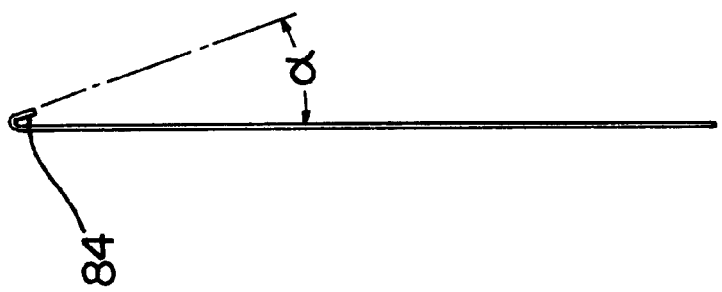
FIG. 13 is a side view of an axle block according to the preferred embodiment.

As seen in FIG. 13, the upper edge of the side panel 83 is bent to form an angular channel 84 with $\alpha=18°$, for example. As further seen in FIG. 14, this channel provides an angled mounting surface 101 for a cover slide 103 of "E"-shaped cross-section, which may be a commercially-available aluminum extrusion. Each cover section 14, 15 has an end 105 encased by nylon edging 107, which provides for easy sliding of the cover sections 14, 15 in the cover slide 103. The opposite side panel 83 contains a mirror image bent channel 84 and E-shaped cover slide mechanism. The bent channel 84 permits the E-shaped channel to be disposed normal to the arc of the cover sections 14, 15.

Each side panel 83 further includes four holes 85 and one large hole 86, for mounting an axle block 88 (FIG. 15). Each axle block 88 receives and mounts one end of a shoulder bolt which serves as the axle 91 for each 20-inch-diameter wheel 23.

Mounting of the cash drawer roller slide 95 is illustrated in FIG. 16. The bill/change drawer 20 is mounted on drawer slides 95 which are angled, preferably at approximately 2 degrees sloping forward. This angling tends to cause the drawer 20 to close when the cart 11 is underway, thus rendering the drawer 20 self-closing.

As will be appreciated, the preferred embodiment features 20-inch-diameter wheels 23 centered within the cart 11, with one recessed 4-inch swivel caster 24 at each corner. The inner bulkhead walls 35, 37 and outer walls 83 transfer the cart load to the respective axles of the centrally-located 20-inch wheels 23. The 20-inch wheels 23, when so configured, support 90% or more of the load, while the four swivel casters 24 add to stability. The 20-inch wheels 23 require minimum effort to roll on carpet, while the four spring-loaded casters 24 can retract approximately 1 inch to allow ease in crossing door thresholds. The 20-inch wheels 23, when located in the center of the cart, further allow a minimum turning radius. The cart 11 will, in fact, turn in its own length.

The two sliding doors 14, 15 cover the change compartment 13 and are arched, preferably to an approximate 18-inch radius. This arch tends to stiffen the doors 14, 15, thus providing a more secure coin compartment 13. Also, the arch of the doors 14, 15 discourages the placement of drinks and so forth on the top of the cart 11. Casino change personnel tend to set coin cans on top of the carts, which is against casino regulations and which is discouraged or prevented by the structure of the preferred embodiment.

Finally, a removable pan 120 (FIG. 16) is provided with three-inch sides and ends, which can be turned over to vary the change compartment depth by three inches. This three-inch variation varies the payload of the change compartment 13 from approximately $9,000 to $6,000. The pan 120 is mounted by angle clips 125 mounted to the inside of the outer panels 63, 71, 83. These clips 125 preferably extend around the entire inner perimeter of the cart 11 so that the pan 120 cannot fall through.

Figure 18:
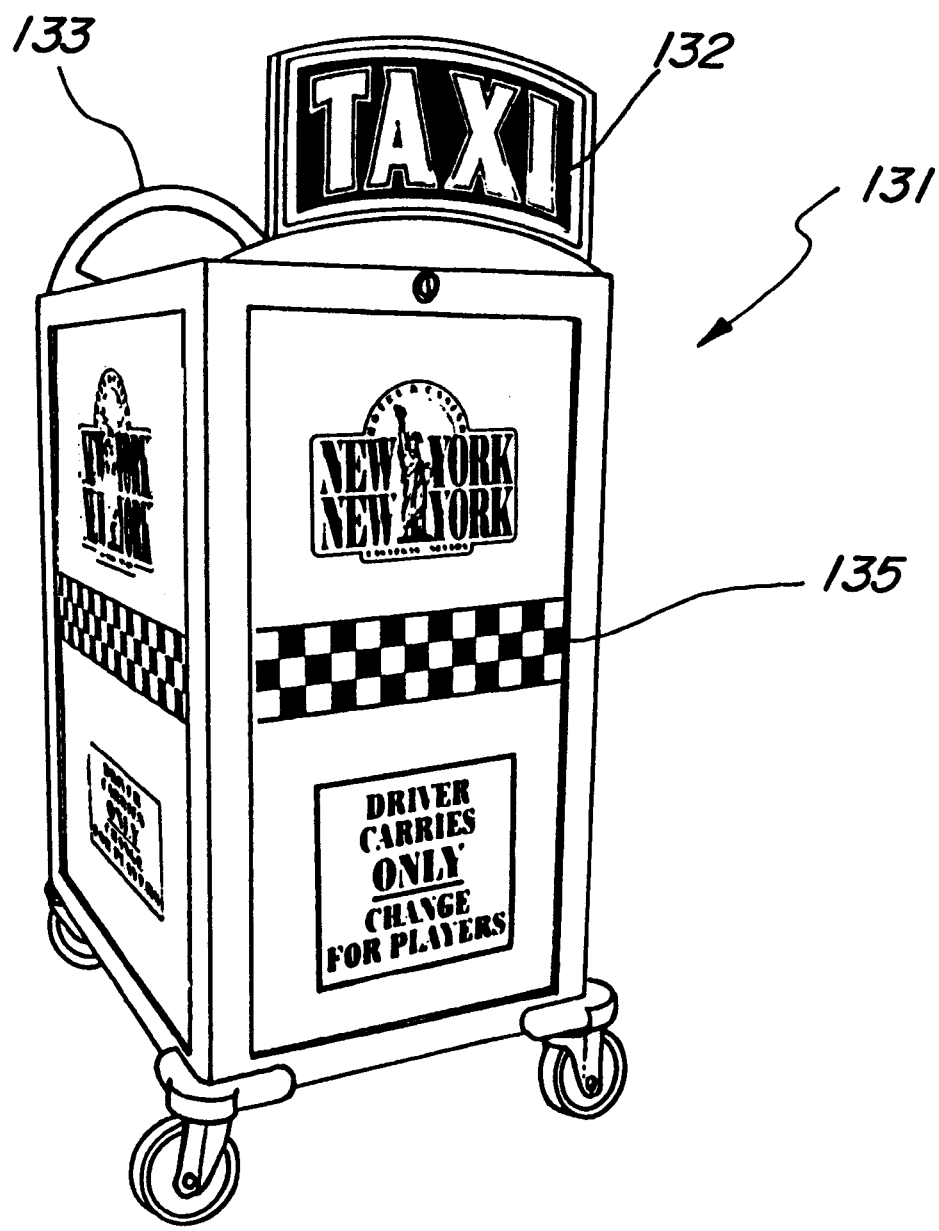
FIG. 18 is a perspective view of a taxicab money cart embodiment.

Corner trim, e.g. 12, 28 is provided at each corner of the cart 11. The cart is constructed by first building the internal frame 33, then attaching the outer panels, and then attaching the corner trim 12, 28 to the outer panels. The corner trim 12, 28 and rivets 29 tie the panels and cart into a box shape. The corner trim 12, 28 is preferably formed of stainless steel with a joggle 112 on the outside edge (FIG. 17). This joggle 112 provides a channel 113 for receiving slip-in boards 114 typically formed of plexiglass and having customer graphics with, for example, casino logos on the sides and a "change" sign on the front face 62. The slip-in boards 114 may be so decorated as to create various fanciful cart designs such as a treasure chest, robot, or the "taxicab" cart 131 of FIG. 18 having a "taxi" sign 132, a rear-mounted steering wheel handle 33, and checkerboard graphics 135. Such carts may then match, or form a design element in, a particular casino design or decor motif or theme, such as "Treasure Island," a New York City theme, or "Star Wars."

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A casino change cart comprising:

an internal bulkhead structure comprising a rectangular top surface having first and second parallel side edges, first and second rectangular side walls having respective outer surfaces, and a rectangular bottom wall, each said side wall being mounted parallel to the other and parallel to a respective side edge of said top surface, each side wall being attached to said top surface along a respective line inset an equal distance from a respective side edge, said bottom wall being attached between said side walls at respective bottom edges of said side walls and shaped so as to close the space between said side walls;

a first rectangular side panel spaced from and generally parallel to said outer surface of said first side wall and a second rectangular side panel spaced from and generally parallel to said outer surface of said second side wall, each said rectangular panel having a horizontal width equal to the width of a respective said side wall;

a first axle fixedly mounted for rotation between said first side wall of said housing structure and said first side panel;

a second axle fixedly mounted for rotation between said second side wall of said housing structure and said second side panel;

first and second wheel means respectively mounted on said first and second axles, said first and second wheel means being equal in diameter, said diameter being of length less that the horizontal width of said side panels and sized for easily rolling over carpet when said change cart contains payload; and first, second, third, and fourth casters positioned at respective bottom corners of said change cart.

2. A change cart as recited in claim 1 further comprising an arched cover above said upper surface of said top of said housing structure, said arched cover forming an enclosed space between said cover and said upper surface of said top of said housing structure whereby said arched cover thereby inhibits placement of articles thereon.

3. A change cart as recited in claim 2 wherein said arched cover comprises sliding door members, said sliding door members permitting access to said enclosed space between said cover and said upper surface of said housing structure.

4. A change cart as recited in claim 1 further comprising a rear wall panel, said rear wall panel having a handle means for steering and pushing said change cart.

5. A change cart as recited in claim 4 wherein said change cart has a sliding currency drawer, said rear wall panel having an aperture for receivably supporting said sliding currency drawer therein, said sliding currency drawer further being mounted on drawer slides positioned on the inner surface of said first and second side walls of said housing structure.

6. A change cart as recited in claim 5 wherein said drawer slides have a first end terminating near said rear wall panel and a second end distant from said first end, said second end being located slightly below said first end so as to gravitationally bias said currency drawer in the closed position.

7. A change cart as recited in claim 1 wherein said first, second, third, and fourth casters are positioned to operate in a plane just above a horizontal plane tangent to the bottom edges of the first and second wheel means whereby said first and second wheel means bear said change cart's primary load during normal operation while said casters provide stability to said change cart.

8. A change cart as recited in claim 7 wherein said casters are retractably spring loaded so as to absorb small perturbations in a surface over which said cart rolls.

9. A change cart as recited in claim 1 further including a panel means located between said top surface and said bottom wall for separating said bulkhead structure into a plurality of compartments suitable for storage; and a plurality of apertures in said rear wall providing access to said compartments.

10. A casino change cart comprising:

a housing structure having first and second side walls, a front panel, a rear wall, a bottom plate and a top plate having respective ends extending beyond respective top edges of said first and second side wall, said top plate further having a planar to surface;

a nonplanar cover having a convex cross-section positioned above said upper surface of said top plate, said nonplanar cover and said upper surface forming a storage area therebetween;

a handle mounted on said rear wall;

first and second side panels generally parallel to and spaced apart from said first and second side walls of said housing structure respectively, said side panels being fixedly mounted to respective edges of said top plate and depending therefrom;

first and second axles mounted between the first side wall and first side panel, and the second side wall and second side panel, respectively;

first and second wheel means mounted on said first and second axles respectively, each said wheel means having a common diameter;

a rearwardly opening sliding currency drawer mounted on drawer slides positioned on said upper surface of said top plate, said sliding currency drawer sliding open along said drawer slides through an aperture in said rear wall, said drawer slides being angled downwardly to gravitationally bias said currency drawer in a closed position; and four casters positioned at respective bottom corners of said cart, said casters operating in a common plane, said common plane being located slightly above a horizontal plane tangent to the bottom edges of the first and second wheel means so as to permit said wheel means to maintain a primary load bearing function while said casters provide stability to overall locomotion of said casino change cart.

11. A casino apparatus comprising:

a box-shaped change cart having at least a pair of wheels; and means adapting said cart to match a selected casino theme, said means including: a plurality of components attached to said cart, said components comprising means for suggesting to an observer an object other than a change cart.

12. The apparatus of claim 11 wherein said components include a plurality of rectangular side panels and means rendering said side panels slideably insertable and removable from said cart.

13. The apparatus of claim 11 wherein said object is a taxicab.

14. The casino apparatus of claim 11 wherein said change cart further comprises:

an underside, a front panel, and first and second side panels, each said side panel having oppositely disposed vertical edges;

at least one cash receptacle mounted in said change cart;

first and second wheel means rotatably mounted about a common axis and centrally located with respect to said oppositely disposed vertical edges and sized for carrying the primary load of said cart, the box shape and said first and second wheel means cooperating to enable manual turning of said cart on its own centerline; and a plurality of caster means located on the underside of said change cart for stabilizing said cart.

15. The apparatus of claim 11 wherein respective bottom edges of said, first and second wheel means lie tangent to a horizontal plane and wherein each said caster means has a bottom edge recessed a common distance above said horizontal plane, said common distance being selected to permit said casters to touch carpet while still enabling said first and second wheel means to carry the primary weight of said cart.

16. The apparatus of claim 14 wherein said plurality of caster means comprises four casters, each located at a respective lower corner of said cart.

17. The apparatus of claim 16 wherein respective bottom edges of said first and second wheel means lie tangent to a horizontal plane and wherein each said caster means has a bottom edge recessed a common distance above said horizontal plane, said common distance being selected to permit said casters to touch carpet while still enabling said first and second wheel means to carry the primary weight of said cart.

18. The apparatus of claim 14 further including handle means attached to said cart for permitting an operator to move and turn said cart by grasping said handle means and pivoting said cart on said first and second wheel means.

19. The apparatus of claim 17 further including means for mounting a plurality of slip-in decorative boards adjacent at least one of said side panels.

20. The apparatus of claim 14 further including means for mounting a plurality of slip-in decorative boards adjacent said side panels.

21. The apparatus of claim 14 further including means in said cart for forming an open-faced storage compartment in the rear of said cart.

22. The apparatus of claim 14 further including panel means in said cart for forming an open-faced storage compartment in a rear portion of said cart.

23. The apparatus of claim 18 further including means in said cart for forming an open-faced storage compartment in the rear of said cart beneath said handle means.

24. The apparatus of claim 16 further including means in said cart for forming an open-faced storage compartment in the rear of said cart.

25. The apparatus of claim 14 wherein said side panels are each 24 inches wide and less than 30 inches high.

26. The apparatus of claim 14 wherein said side panels are each 24 inches wide by 30 inches high to the nearest inch.

27. A casino change cart comprising:

a box structure having an underside, a front panel, and first and second side panels each said side panel having oppositely disposed vertical edges;

as least one cash receptacle mounted in said box structure;

first and second wheel means rotatably mounted about a common axis and centrally located with respect to said oppositely disposed vertical edges and sized for carrying the primary load of said cart, said box structure and said first and second wheel means cooperating to enable manual turning of said cart on its own centerline;

a plurality of caster means located on the underside of said box structure for stabilizing said cart; and a currency drawer and a pair of drawer slides, each drawer slide have a first end and a second end distant from said first end, said second end being located slightly below said first end so as to gravitationally bias said currency drawer in the closed position.

* * * * *